United States Patent
Ljung et al.

(10) Patent No.: US 10,383,028 B2
(45) Date of Patent: Aug. 13, 2019

(54) METHOD OF REQUESTING ACTIVATION OF A REPEATER FUNCTION AND USER EQUIPMENT

(71) Applicant: Sony Corporation, Tokyo (JP)

(72) Inventors: Rickard Ljung, Helsingborg (SE); Saif Alnashi, Staffanstorp (SE)

(73) Assignee: Sony Corporation, Tokyo (JP)

( * ) Notice: Subject to any disclaimer, the term of this patent is extended or adjusted under 35 U.S.C. 154(b) by 411 days.

(21) Appl. No.: 14/377,746

(22) PCT Filed: Jul. 30, 2013

(86) PCT No.: PCT/IB2013/001650
§ 371 (c)(1),
(2) Date: Aug. 8, 2014

(87) PCT Pub. No.: WO2015/015234
PCT Pub. Date: Feb. 5, 2015

(65) Prior Publication Data
US 2016/0174130 A1  Jun. 16, 2016

(51) Int. Cl.
*H04W 40/22* (2009.01)
*H04W 88/04* (2009.01)
(Continued)

(52) U.S. Cl.
CPC ........ *H04W 40/22* (2013.01); *H04B 7/15507* (2013.01); *H04W 4/06* (2013.01);
(Continued)

(58) Field of Classification Search
CPC ........................... H04B 7/15507; H04W 40/22
See application file for complete search history.

(56) References Cited

U.S. PATENT DOCUMENTS 4,152,647 A * 5/1979 Gladden .............. H04B 7/2621
455/11.1
2007/0127421 A1  6/2007 D'Amico et al.
(Continued)

FOREIGN PATENT DOCUMENTS

JP  2001036459 A  2/2001
JP  2007096988 A  4/2007
(Continued)

OTHER PUBLICATIONS

3rd Generation Partnership Project; Technical Specification Group Services and System Aspects; Service requirements for the Evolved Packet System (EPS) (Release 12); 3GPP TS 22.278 V12.2.0 (Mar. 2013).
(Continued)

*Primary Examiner* — Sulaiman Nooristany
(74) *Attorney, Agent, or Firm* — Tucker Ellis LLP (57) ABSTRACT

A user equipment transmits at least one repeater information request (42, 52) to at least one terminal device to request information on a repeater capability of the at least one terminal device. The user equipment receives at least one repeater information response (43, 53) from the at least one terminal device. The user equipment selects a terminal device based on the received at least one repeater information response (43, 53). The user equipment transmits a repeater transition request (45) to the selected terminal device to request the selected terminal device to initiate activation of a repeater function.

17 Claims, 7 Drawing Sheets

(51) Int. Cl.
  *H04B 7/155* (2006.01)
  *H04W 4/06* (2009.01)
  *H04W 8/00* (2009.01)
  *H04W 4/021* (2018.01)
  *H04W 88/18* (2009.01)

(52) U.S. Cl.
  CPC ........... *H04W 8/005* (2013.01); *H04W 88/04* (2013.01); *H04W 4/021* (2013.01); *H04W 88/182* (2013.01)

(56) References Cited

U.S. PATENT DOCUMENTS

| | | | |
|---|---|---|---|
| 2009/0325622 | A1 | 12/2009 | Matsumura et al. |
| 2011/0124312 | A1* | 5/2011 | Kwon, II ............... H04W 4/22 455/404.2 |
| 2012/0183141 | A1 | 7/2012 | Hapsari et al. |
| 2013/0016708 | A1 | 1/2013 | Haba |
| 2013/0083722 | A1* | 4/2013 | Bhargava ............. H04W 48/20 370/315 |
| 2013/0288668 | A1 | 10/2013 | Pragada et al. |
| 2013/0325407 | A1* | 12/2013 | Lee ......................... G06F 17/00 702/188 |
| 2014/0010108 | A1 | 1/2014 | Tavildar et al. |
| 2014/0119272 | A1 | 5/2014 | Wong et al. |
| 2014/0126462 | A1 | 5/2014 | Vardhan et al. |
| 2014/0198708 | A1 | 7/2014 | Lee |
| 2014/0219161 | A1 | 8/2014 | Kowalewski |
| 2014/0307611 | A1 | 10/2014 | Tesanovic et al. |
| 2015/0029866 | A1 | 1/2015 | Liao et al. |
| 2015/0127733 | A1 | 5/2015 | Ding et al. |
| 2015/0215984 | A1 | 6/2015 | Schmidt et al. |
| 2015/0208225 | A1 | 7/2015 | Yu et al. |

FOREIGN PATENT DOCUMENTS

| | | |
|---|---|---|
| JP | 2008271523 A | 11/2008 |
| JP | 2012074757 A | 4/2012 |
| WO | 2014184600 A1 | 11/2014 |

OTHER PUBLICATIONS

3rd Generation Partnership Project; Technical Specification Group Services and System Aspects; Feasibility study for Proximity Services (ProSe) (Release 12); 3GPP TR 22.803 V12.1.0 (Mar. 2013).

3rd Generation Partnership Project;Technical Specification Group Radio Access Network; Evolved Universal Terrestrial Radio Access (E-UTRA); Radio Resource Control (RRC); Protocol specification (Release 11); 3GPP TS 36.331 V11.4.0 (Jun. 2013).

ZTE: "ProSe UE-to_Network Relay", 3GPP Draft; S2-133038—Application Based Prose Relays, 3rd Generation Partnership Project (GPP), Mobile Competence Centre; 650, Route des Lucioles, F-06921, Sophia-Antipolis Cedex, France; vol. SA WG2, no. Valencia, Spain, Jul. 15, 2013-Jul 19, 2013, Jul. 19, 2013, XP050726383, Retrieved from the Internet: URL:http://www.3gpp.org/ftp/tsg_sa/WG2_Arch/TSG2_98_Valencia/Docs/ [retrieved on Jul. 19, 2013].

"3rd Generation Partnership Project (GPP); Technical Specification Group Services and System Aspects; Study on architecture enhancements to support Proximity Services (ProSe) (Release 12)", 3GPP Draft; 23703-050-PROSE-RM, 3rd Generation Partnership Project (GPP), Mobile Competence Centre; 650, Route des Lucioles, F-06921, Sophia-Antipolis Cedex, France; Jul. 27, 2013, XP050725380, Retrieved from the Internet: URL:http://www.3gpp.org/ftp/tsg_sa/WG2_Arch/Latest_SA2_Specs/Latest_draft_S2_Specs/ [retrieved on Jul. 27, 2013] section 06.3.1.

International Search Report and Written Opinion, dated Mar. 31, 2014, issued in International Patent Application No. PCT/IB2013/001650.

International Search Report and Written Opinion, dated Mar. 31, 2014, issued in International Patent Application No. PCT/IB2013/001883.

International Preliminary Report on Patentability, dated Feb. 11, 2016, issued in International Patent Application No. PCT/IB2013/001650.

ZTE, "ProSe UE-to-Network Relay", 3GPP S2-133038 SA WG2 Meeting #98, Valencia Spain, Jul. 15, 2013.

"3rd Generation Partnership Project; Technical Specification Group Services and System Aspects; Service requirements for the Evolved Packet System (EPS) (Release 12)". 3GPP TS 22.278 V12.3.0 (Jun. 2013).

"3rd Generation Partnership Project; Technical Specification Group Services and System Aspects; Feasibility study for Proximity Services (ProSe) (Release 12)". 3GPP TR 22.803 V12.2.0 (Jun. 2013).

"3rd Generation Partnership Project; Technical Specification Group Services and System Aspects; Study on architecture enhancements to support Proximity Services (ProSe) (Release 12)". 3GPP TR 23.703 V0.4.1 (Jun. 2013).

"3rd Generation Partnership Project; Technical Specification Group Radio Access Network; Evolved Universal Terrestrial Radio Access (E-UTRA); Relay architectures for E-UTRA (LTE-Advanced) (Release 9)". 3GPP TR 36.806 V9.0.0 (Mar. 2010).

\* cited by examiner

METHOD OF REQUESTING ACTIVATION OF A REPEATER FUNCTION AND USER EQUIPMENT

FIELD OF THE INVENTION

The invention relates to wireless communication systems. The invention relates in particular to techniques which allow a terminal device of the wireless communication system to transition into a repeater relay.

BACKGROUND OF THE INVENTION

The demand for mobile data and voice communication continues to evidence a significant growth. Examples for wireless communication systems include cellular-based wireless communication networks. Such networks include various network nodes. The network nodes may include base stations which respectively provide coverage for a radio cell.

A terminal device located outside of the coverage areas of the base stations cannot communicate with a radio access network of the wireless communication system. To improve the coverage of the wireless communication system, the number and density of installed base stations may be increased to provide additional radio cells. Alternatively or additionally, dedicated repeaters may be provided. With a repeater, the signals transmitted between a base station and a terminal device may be repeated, i.e. forwarded or sent again, in order to improve network coverage. The dedicated repeaters may be fixedly installed or may be mobile devices.

In addition to the extension of coverage achievable by a deployed repeater, there may be other reasons for using a repeater. One scenario may be that the wireless communication system shall be able to dynamically increase its network coverage to support emergency services required for public safety requirements. Therefore, in such a communication system it may be required to quickly expand network coverage and capacity at specific locations, even if these locations are at the border or outside the ordinary network coverage area. In another scenario it may be required that the coverage of a radio cell should be dynamically increased due to a failure of a neighboring base station. When several candidate repeaters are available, a suitable transmission path may be identified under the control of a base station or a control node in a radio access network or core network. However, such approaches may suffer from reduced flexibility and/or may add to traffic loads in a radio access network.

The deployment of dedicated repeaters or additional base stations may add to the costs of the wireless communication network, both as regards installation and as regards maintenance. The techniques outlined above may also suffer from reduced flexibility.

SUMMARY OF THE INVENTION

There is a need in the art for techniques which allow the coverage of a radio cell of a wireless communication system to be dynamically increased at low cost. There is in particular a need for such techniques in which a device which can start acting as a repeater may be identified in an efficient way.

According to exemplary embodiments of the invention, a method and user equipment as recited in the independent claims are provided. The dependent claims define further embodiments.

According to an embodiment, a method of requesting activation of a repeater function by a user equipment is provided. The user equipment is configured to communicate with a radio access network. In the method, the user equipment transmits at least one repeater information request to at least one terminal device to request information on a repeater capability of the at least one terminal device. The at least one terminal device is configured to communicate with the radio access network. The user equipment receives at least one repeater information response from the at least one terminal device. The user equipment selects a terminal device from the at least one terminal device based on the received at least one repeater information response. The user equipment transmits a repeater transition request to the selected terminal device to request the selected terminal device to initiate activation of a repeater function for relaying messages between the user equipment and the radio access network.

In the method, the user equipment identifies a terminal device as a suitable candidate repeater. The selected terminal device is requested to transition into a repeater by the user equipment. At that time, the selected terminal device does not yet execute any repeater function for relaying messages. The user equipment may dynamically request the selected terminal device to start acting as a repeater. The repeater function of the selected terminal device is activated selectively only when this terminal device is identified as being suitable for transitioning into a repeater.

Each repeater information response may include information on a repeater capability of the respective terminal device.

The information on the repeater capability may include at least one bit indicating whether or not the terminal device from which the repeater information response is received can act as a repeater for the user equipment.

The information on the repeater capability included in the repeater information response may depend on whether the repeater information request indicates that there is an emergency.

The at least one repeater information response may include configuration information for the respective terminal device. The user equipment may evaluate the configuration information included in the at least one repeater information response to select the terminal device.

The configuration information may comprise data detected at the terminal device from which the respective repeater information response is received.

The configuration information may include a network coverage quality indicator for the terminal device from which the respective repeater information response is received. The network coverage quality indicator may comprise an indicator for a received signal strength at the terminal device from which the respective repeater information response is received.

The user equipment may prioritize terminal devices such that priority is given to a terminal device reporting better network coverage quality when selecting the terminal device which is to act as a repeater.

Alternatively or additionally, the configuration information may include mobility data for the terminal device from which the respective repeater information response is received. The mobility data may quantify how stationary or mobile the terminal device has been in a time interval prior to receipt of the repeater information request.

The user equipment may prioritize a terminal device reporting lower mobility over a terminal device reporting higher mobility when selecting the terminal device which is to act as a repeater.

Alternatively or additionally, the configuration information may include an output power capability indicator for the terminal device from which the respective repeater information response is received.

The user equipment may prioritize a terminal device reporting that it is capable of transmitting with higher output power when selecting the terminal device which is to act as a repeater.

Alternatively or additionally, the configuration information may include a power supply indicator for the terminal device from which the respective repeater information response is received. The power supply indicator may reflect a battery level of the terminal device from which the respective repeater information response is received.

The user equipment may prioritize a terminal device reporting that it has higher power supply over a terminal device reporting that it has lower power supply when selecting the terminal device which is to act as a repeater.

The user equipment may perform a prioritization based on the configuration information included in the at least one repeater information response to select the terminal device.

The user equipment may have a user interface. At least one parameter of the prioritization may be configurable by a user via the user interface.

The user equipment may perform a device-to-device discovery to discover the at least one terminal device. The user equipment may transmit the at least one repeater information request to the at least one terminal device discovered in the device-to-device discovery.

The repeater information request and the repeater transition request may be transmitted via device-to-device communication. The repeater information request and the repeater transition request may be transmitted directly between the user equipment and the terminal devices, without being transmitted to the base station or otherwise transiting the radio access network.

The selected terminal device may activate the repeater function in response to receiving the repeater transition request.

Activating the repeater function by the selected terminal may comprise requesting, by the selected terminal device, a base station to permit activation of the repeater function.

Activating the repeater function by the selected terminal may comprise receiving, by the selected terminal device, a permission from the base station to activate the repeater function.

The selected terminal device may start acting as a repeater and may relay messages between the user equipment and a base station of the radio access network when the repeater function of the selected terminal device is active. The messages may include data messages. The messages may includes signaling messages.

The user equipment may transmit the repeater information request to a plurality of terminal devices. The user equipment may receive the repeater information response from each terminal device of the plurality of terminal devices.

The user equipment may transmit the repeater transition request only to one selected terminal device, i.e., to just one terminal device.

More than one terminal device may be selected. The user equipment may transmit the repeater transition request to several selected terminal devices.

The user equipment may include an indicator in the repeater information request to indicate whether the repeater function is required for emergency communication.

The user equipment may have a user interface which allows the user to indicate whether communication is required for an emergency, and the user equipment may selectively include an indicator for emergency communication in the repeater information request based on the user input.

The at least one terminal device may determine whether an indicator for an emergency is included in the repeater information request. The at least one terminal device may generate the repeater information response in dependence on whether the repeater information request has an indicator for emergency. The radio access network may be an Evolved Universal Terrestrial Radio Access Network (E-UTRAN).

According to an embodiment, a user equipment is provided. The user equipment comprises a wireless interface configured for communication with a radio access network of a wireless communication network. The user equipment comprises a processing device coupled to the wireless interface. The processing device is configured to transmit, via the wireless interface, at least one repeater information request to at least one terminal device to request information on a repeater capability of the at least one terminal device. The processing device is configured to receive, via the wireless interface, at least one repeater information response from the at least one terminal device. The processing device is configured to select a terminal device from the at least one terminal device based on the received at least one repeater information response. The processing device is configured to transmit, via the wireless interface, a repeater transition request to the selected terminal device to request the selected terminal device to activate a repeater function of the selected terminal device.

The processing device may be configured to determine, based on each repeater information response, whether the respective terminal device is capable of acting as a repeater.

The processing device may be configured to evaluate configuration information included in the at least one repeater information response to select the terminal device.

The processing device may perform a selection algorithm to select the terminal device.

The user equipment may have a user interface. The processing device may be configured to configure or reconfigure the selection algorithm in response to an input received at the user interface.

The processing device may be configured select the terminal device based on configuration information which includes a network coverage quality indicator for the terminal device from which the respective repeater information response is received.

Alternatively or additionally, the processing device may be configured select the terminal device based on mobility data for the terminal device from which the respective repeater information response is received.

Alternatively or additionally, the processing device may be configured select the terminal device based on an output power capability indicator for the terminal device from which the respective repeater information response is received.

Alternatively or additionally, the processing device may be configured select the terminal device based on a power supply indicator for the terminal device from which the respective repeater information response is received.

The user equipment may not only act as a requesting device which requests the activation of a repeater function in a terminal device, but may also be a candidate repeater itself. The processing device may be configured to receive, via the wireless interface, another repeater information request from a requesting user equipment, and transmit, via the wireless interface, another repeater information response to the requesting user equipment.

The processing device may be configured to generate the other repeater information response such that it includes information indicating a repeater capability of the user equipment and configuration information detected at the user equipment.

The processing device may be configured to generate the other repeater information response such that the configuration information includes at least one of: a network coverage quality indicator for the user equipment, mobility data for the user equipment, an output power capability indicator for the user equipment, and/or a power supply indicator for the user equipment.

The wireless interface may be configured for communication over an Evolved Universal Terrestrial Radio Access (E-UTRA) air interface.

The user equipment may be configured to perform the method according to an embodiment.

According to another embodiment, a user equipment is provided. The user equipment comprises a wireless interface configured for communication with a radio access network of a wireless communication network. The user equipment comprises a processing device coupled to the wireless interface. The processing device is configured to receive, via the wireless interface, a repeater information request from a requesting user equipment, and transmit, via the wireless interface, a repeater information response to the requesting user equipment.

The processing device may be configured to generate the repeater information response such that it indicates whether the user equipment is capable of acting as a repeater.

The processing device may be configured to determine whether an indicator for emergency communication is included in the repeater information request and may set an indicator for the repeater capability in the repeater information response in dependence on whether the repeater information request includes the indicator for an emergency.

The processing device may be configured to generate the repeater information response such that it includes configuration information detected at the user equipment.

According to another embodiment, a communication system is provided. The communication system comprises a radio access network. The communication system comprises a user equipment according to an embodiment. The communication system comprises a terminal device having a wireless interface configured to communicate with the radio access network and to transmit the repeater information response when receiving the repeater information request from the user equipment.

The communication system may be configured to perform the method according to an embodiment.

In the methods, devices and systems according to embodiments, the signaling between the user equipment and the terminal devices may be implemented as device-to-device communication.

In the methods, devices and systems according to embodiments, the terminal device with activated repeater function may be a unit which has the capability of relaying or forwarding information in any direction between the base station and the user equipment. The repeater function may be applied at any protocol layer. The repeater function may be implemented at the physical layer. The repeater function activated in the terminal device may be operative to perform physical layer signal forwarding.

The repeater function may be implemented at the second layer, the third layer or higher layers of the Open Systems Interconnection (OSI) layer model. The repeater function which may be activated in the terminal device may be operative to perform decoding/encoding and/or demodulating/modulating information for relay functionality applied at higher protocol layers of the OSI layer model.

The methods, devices and systems according to various embodiments provide a signaling which allows a user equipment to identify a candidate terminal device for the purpose of transforming this terminal device to a repeater in a wireless communication system.

Although specific features described in the above summary and the following detailed description are described in the context of specific embodiments and aspects of the invention, the features of the embodiments and aspects may be combined with each other unless specifically noted otherwise.

BRIEF DESCRIPTION OF THE DRAWINGS

Embodiments of invention will now be described in more detail with reference to the accompanying drawings.

DETAILED DESCRIPTION OF PREFERRED EMBODIMENTS

In the following, exemplary embodiments of the invention will be described in more detail. It has to be understood that the features of the various exemplary embodiments described herein may be combined with each other unless specifically noted otherwise. Identical or similar reference numerals refer to identical or similar components.

Figure 1:
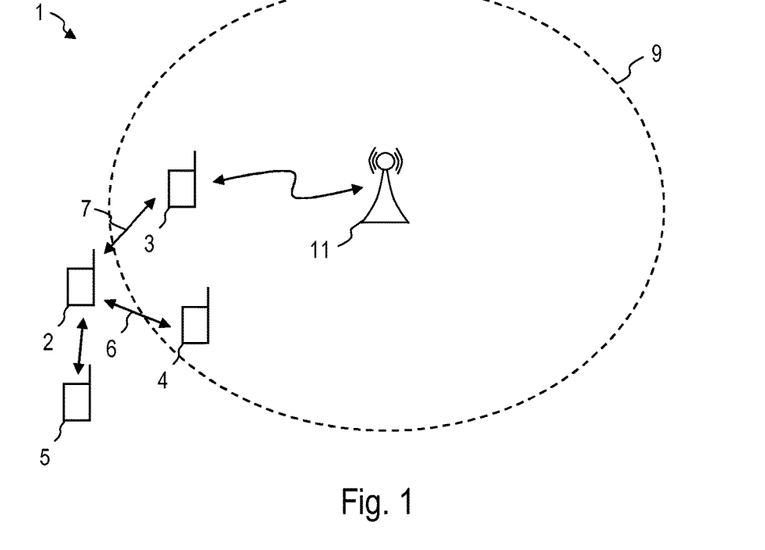
FIG. 1 shows a communication system according to an embodiment.

FIG. 1 shows a communication system 1 according to an embodiment. The communication system 1 is configured as a cellular wireless communication system. The communication system 1 may comprise a plurality of base stations. One of the base stations is shown as base station 11 in FIG. 1. The base stations may communicate with each other via wireless radio communications or via an operator core network. The communication network may be a Long Term Evolution (LTE) network. A radio access network (RAN) of the communication network may be an evolved UTRAN (E-UTRAN), with the base station 11 being an evolved Node B (eNodeB). The base station 11 may be connected to a Mobility Management Entity (MME) and/or Serving Gateway (S-GW) in the core network.

The base station 11 provides a radio cell 9 in which terminal devices 3, 4 may communicate directly with the base station 11 via radio frequency communication. The terminal devices 3, 4 may respectively have a wireless interface for communication with the E-UTRAN.

A user equipment (UE) 2 may be located outside the radio cell 9, i.e., outside the coverage of the base station 11. The user equipment 2 may also have a wireless interface configured for communication with the E-UTRAN or another RAN. However, when the user equipment 2 is located outside of the radio cell 9, as illustrated in FIG. 1, it cannot directly communicate with the base station 11.

Yet another terminal device 5 may also be located outside of the radio cell 9.

While the term "terminal device" is used herein to refer to the terminal devices 3, 4, and 5 which are candidate repeaters, as will be explained in more detail below, it is to be understood that the terminal devices 3, 4, and 5 may respectively be devices used directly by an end-user to communicate. Both the user equipment 2 and the terminal devices 3, 4, and 5 may respectively be configured as handheld devices or other devices operated by an end-user. In particular, the terminal devices 3, 4, and 5 may also be user equipments as defined in 3GPP LTE. The term "terminal device" will generally be used herein to refer to the devices which receive a repeater information request from the UE 2, it being understood that the UE 2 and the terminal devices 3, 4, and 5 may have identical configurations.

The UE 2 and the terminal devices 3, 4, and 5 may respectively be a mobile communication terminal, which may be implemented as a hand-held telephone, a personal digital assistant, a computing device equipped with a mobile communication adapter, a machine having a mobile communication interface, or any one of a wide variety of other devices.

The UE 2 is configured to directly communicate with the terminal devices 3-5 located in proximity to the UE 2. The corresponding device-to-device (D2D) communication 6, 7 does not need to be, and generally is not, transmitted via any one of the base stations of the wireless communication network. As will be explained in more detail below, the UE 2 may perform D2D communication to select one of the terminal devices 3-5 which is suitable to start acting as a repeater for relaying messages between the UE 2 and the base station 11. The UE 2 may request the selected terminal device to start acting as a repeater. Before that, the respective selected terminal device may be operative as a conventional mobile communication terminal which does not perform any repeater function when it receives the repeater information request from the UE 2.

As will be explained in more detail below, the UE 2 is configured to ask the terminal devices 3-5 located in proximity to the UE 2 for repeater capability. The UE 2 may also ask the terminal devices 3-5 located in proximity to the UE 2 to provide information on a configuration of the respective terminal device which relates to their suitability for acting as a repeater between the UE 2 and the base station 2.

The term "repeater" or "repeater function" as used herein is understood to include "relay" or "relay function". The "repeater function" activated in a terminal device may perform relaying or forwarding of signals or messages at the physical layer or at higher layers.

Based on responses received from the terminal devices 3-5 located in proximity to the UE 2, the UE 2 may transmit a repeater transition request to a selected one of the terminal devices. The repeater transition request may trigger the selected terminal device to execute an activation procedure to start acting as a repeater, i.e., to transition into a repeater relay.

Figure 2:
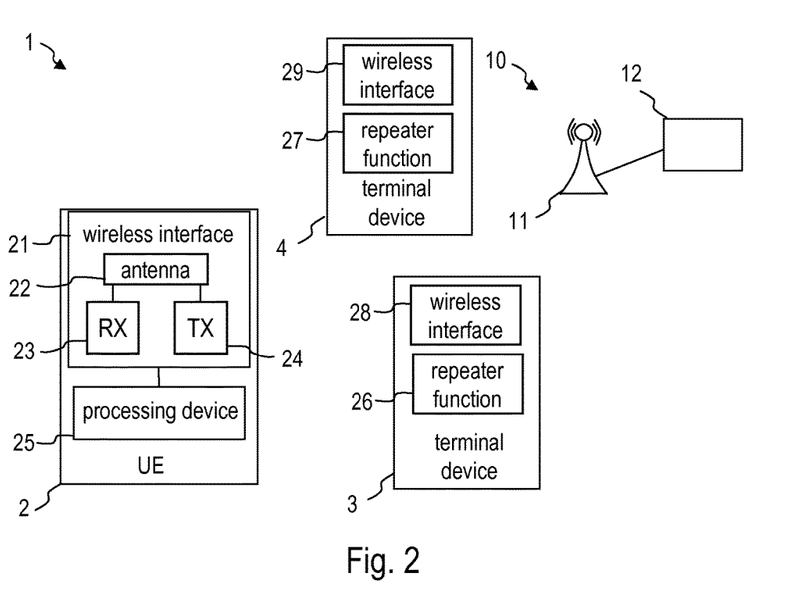
FIG. 2 shows the communication system of FIG. 1, in which a terminal device is identified as a candidate for activating a repeater function.

FIG. 2 is a schematic block diagram of a communication system 1 according to an embodiment. The base station 11 of the RAN 10 is connected to a node 12 of the RAN or the core network (CN). For illustration, for a base station 11 implemented as an eNodeB, the node 12 may be implemented as a MME or S-GW.

The UE 2 has a wireless interface 21. The wireless interface 21 may be configured to communication with the RAN 10. The wireless interface 21 may be configured for communication over the E-UTRA air interface.

The UE 2 has a processing device 25 connected to the wireless interface 21. The processing device 25 may comprise one or several microprocessors, one or several microcontrollers, one or several processors, one or several controllers, one or several application specific integrated circuits (ASICs) and/or a combination of such devices. The processing device 25 may be configured to control the wireless interface 21 to detect at least one terminal device 3, 4 located in proximity to the UE 2. The processing device 25 may be configured to control a transmitter path 24 of the wireless interface 21 to transmit a repeater information request to the at least one terminal device 3, 4 via an antenna 22. The processing device 25 may be coupled to a receiver path 23 of the wireless interface 21 to process a repeater information response received from the least one terminal device 3, 4. The processing device 25 may be configured to select one of the terminal devices 3, 4 from which a repeater information response was received. The processing device 25 may execute a selection mechanism to select one of the terminal devices 3, 4 for acting as a repeater. The processing device 25 may be configured to control the transmitter path 24 to transmit a repeater transition request to the selected terminal device.

The terminal devices 3, 4 respectively have a wireless interface 28, 29 configured to communication with the RAN 10. The wireless interfaces 28, 29 of the terminal devices 3, 4 may be configured for communication over the E-UTRA air interface.

The terminal device 3 has a repeater function 26 which can be selectively activated. When the repeater function 26 is activated, the terminal device 3 may act as a repeater which relays messages between the UE 2 and the base station 11. In the uplink, the terminal device 3 may receive messages from the UE 2 and may re-send the messages to the base station 11. In the downlink, the terminal device 3 may receive other messages from the base station 11 and may re-send the messages to the UE 2. The repeater function 26 may be deactivated upon request from the base station 11 or upon request from the UE 2. Similarly, the terminal device 4 has a repeater function 27 which can be selectively activated.

As will be described in more detail with reference to FIG. 3 to FIG. 8 in the following, the UE 2 performs a signaling which allows the UE 2 to identify a terminal device which is suitable for transitioning into a repeater. The UE 2 may select the one among several terminal devices which is most suitable to start acting as a repeater, when taking into account one or several of network coverage by the RAN 10, output power capability of the terminal devices, and/or mobility of the terminal devices. The UE 2 may selectively request the selected terminal device to activate its repeater function, while the repeater function of the other terminal device(s) may continue to be disabled. The signaling between the UE 2 and the terminal devices which is used to select a terminal device which transitions into a repeater relay may be implemented as direct communication which does not transit the communication network.

The D2D communication between the UE 2 and the terminal devices located in proximity to the UE 2 may be implemented as described in 3GPP TS 22.278. For illustration, the D2D discovery and the D2D communication may be implemented as described in 3GPP TS 22.278 V12.2.0 (2013-03) entitled "3rd Generation Partnership Project; Technical Specification Group Services and System Aspects; Service requirements for the Evolved Packet System (EPS) (Release 12)". The D2D communication may be used for the signaling performed by the UE to select a terminal device and to request activation of the repeater function in the selected repeater.

The D2D communication between the UE 2 and the terminal devices located in proximity to the UE 2 may be implemented as described in 3GPP TR 22.803. For illustration, the D2D discovery and the D2D communication may be implemented as described in 3GPP TR 22.803 V12.1.0 (2013-03) entitled "3rd Generation Partnership Project; Technical Specification Group Services and System Aspects; Feasibility study for Proximity Services (ProSe) (Release 12)". The D2D communication may be used for the signaling used by the UE to select a terminal device as a repeater and to request activation of the repeater function in the selected repeater.

Implementations of this signaling will be described with reference to FIG. 3 to FIG. 8 in the following. The D2D communication may also be used for relaying messages between the UE 2 and the selected terminal device after the repeater function has been activated.

The D2D communication may be performed via the wireless interface of the UE which is configured to communicate with the RAN 10, e.g. with an E-UTRAN. The D2D communication may be performed via the wireless interfaces of the terminal devices which are configured to communicate with the RAN 10, e.g. with an E-UTRAN. In other implementations, at least some of the signaling used to activate the repeater function in a terminal device may be performed over another wireless interface.

Figure 3:
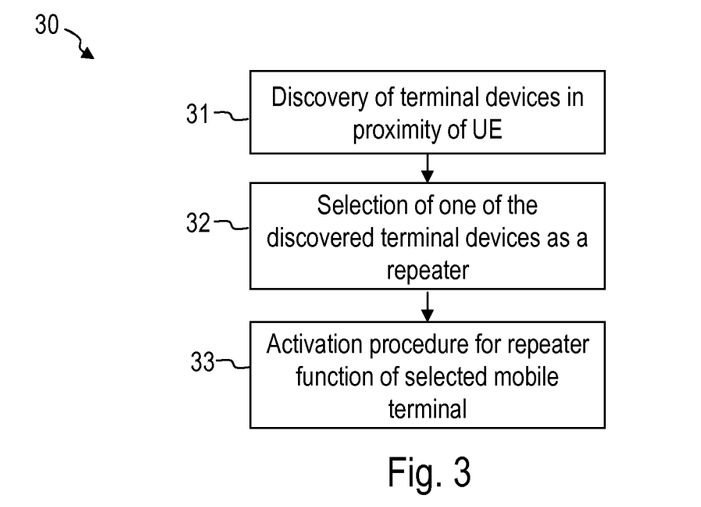
FIG. 3 is a flow chart of a method according to an embodiment.

FIG. 3 is a flow chart of a method 30 according to an embodiment. The method 30 may be performed by a UE according to an embodiment or by a communication system according to an embodiment.

At 31, at least one terminal device located in a proximity of the UE is discovered. The signaling performed in the discovery at step 31 may be implemented as D2D communication. Messages transmitted in the discovery may be transmitted directly between the UE and terminal devices, without transiting the base station or another node of the wireless communication network. The discovery at step 31 may be used to identify at least the terminal devices which are located within a pre-defined distance range from the UE 2. The discovery at step 31 may be used to identify at least the terminal devices which, in a D2D communication with the UE 2 which does not transit the RAN, produce a signal strength at the UE 2 which fulfills a pre-defined stability criterion. For illustration, the D2D discovery may be used to identify terminal devices with which a stable direct communication may be established when the messages do not transit the RAN.

At 32, the UE 2 may perform a procedure for selecting one of the terminal devices discovered at step 31 which shall be requested to activate a repeater function. The selection at step 32 may include a prioritization among terminal devices. The selection at step 32 may be performed by executing a selection algorithm. The selection at step 32 may be performed at the UE 2 without involvement of the RAN, but using information on the terminal devices which is transmitted from the terminal devices to the UE 2. The prioritization and/or selection algorithm may be configurable by a user.

For illustration, as will be explained in more detail with reference to FIG. 4 to FIG. 7, the terminal device(s) detected at step 31 may report to the UE 2 whether they can act as a repeater. This information is also referred to as information on a "repeater capability" herein.

The repeater capability of a terminal device may depend on various circumstances. For illustration, the terminal device may be capable of activating a repeater function for relaying communication between the UE 2 and the RAN if the repeater function is required for relaying a call in an emergency situation. By contrast, the terminal device may not be available for acting as a repeater if there is no emergency. Alternatively or additionally, the terminal device may indicate that it has no repeater capability if its remaining power is too low. Alternatively or additionally, the terminal device may indicate that it has no repeater capability if user settings at the terminal device dictate that the terminal device shall not act as a repeater, with the possible exception of relaying emergency communication.

The UE 2 may select one or several of the terminal devices which indicate that they have repeater capability.

The terminal device(s) discovered at step 31 may additionally provide configuration information indicative of their configuration to the UE 2. The configuration information may be related to the suitability of the respective terminal device for relaying information between the UE 2 and the RAN. The configuration information may include one or several of: network coverage quality (e.g. received signal strength at the terminal device) and/or terminal related information such as mobility statistics, output power capability and/or power supply indicator etc. The configuration information may be used by the UE 2 to select the terminal device which is the most suitable repeater relay candidate. For illustration, the UE 2 may select a terminal device as a suitable repeater when it is stationary, able to transmit at high output power and has a good power supply. Based on the received configuration information, the UE 2 may use a selection mechanism (e.g., a selection algorithm) to be able to determine which one of the terminal devices will act as the most suitable repeater.

In the phase at step 32 in which the UE 2 retrieves information on the repeater capability and/or configuration information for the terminal devices located in proximity to the UE 2, the repeater function may be deactivated in all of the terminal devices discovered at step 31. The selected terminal device may activate its repeater function and may start acting as a repeater only after the UE 2 has retrieved the information on the repeater capability and/or configuration information and has requested the respective selected terminal device to initiate an activation procedure for its repeater function.

At step 33, the UE 2 requests the selected terminal device to start acting as a repeater for relaying messages. The UE 2 may transmit a repeater transition request to the selected terminal device. The repeater transition request may trigger the selected terminal device to transition into a repeater relay.

In response to receiving the repeater transition request from the UE 2, the selected terminal device may activate its repeater function. The selected terminal device may execute an activation procedure for the repeater function. The activation of the repeater function may include requesting a base station for permission to start acting as a repeater. When the base station acknowledges the request, the selected terminal device may start relay communication between the UE 2 and the base station.

Figure 4:
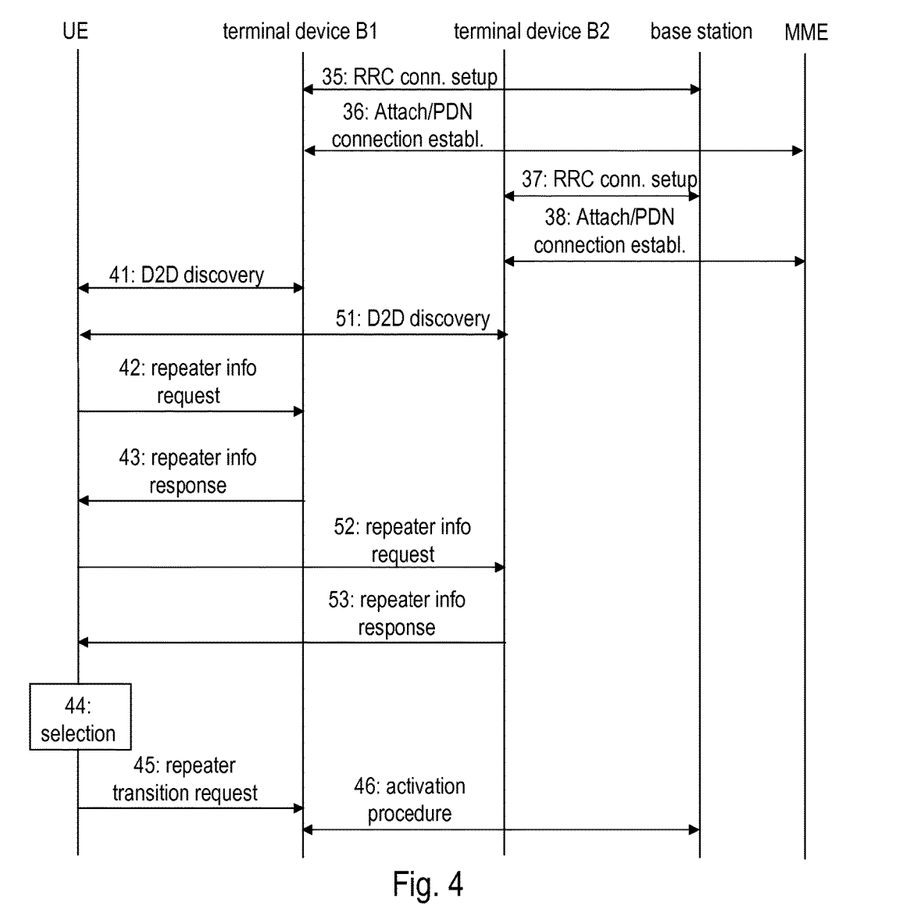
FIG. 4 is a diagram representing signaling in a method according to an embodiment.

FIG. 4 is a diagram illustrating signaling in a method in which a UE requests activation of a repeater function of a terminal device. While the signaling is illustrated for two terminal devices located in proximity to the UE, any other number of terminal devices may be located in proximity to the UE.

The terminal device(s) located in proximity to the UE are labeled terminal device B1 and terminal device B2 in FIG. 4. The terminal device(s) are connected to the base station before the UE can identify them as a suitable repeater. For this purpose, the first terminal device B1 may perform a connection setup. For illustration, the signaling of a Radio Resource Control (RRC) connection setup 35 may be performed. The first terminal device may perform an attach/packet data network (PDN) connection establishment 36. Similarly, the second terminal device B2 and/or other terminal devices located in proximity to the UE may perform a RRC connection setup 37 and an attach/PDN connection establishment 36 before the UE can identify them as suitable candidates for transitioning into a repeater.

The connection establishment may be performed using the signaling defined in 3GPP TS 36.331, for example. For illustration, the signaling defined in 3GPP TS 36.331 V11.4.0 (2013-06) entitled "3rd Generation Partnership Project; Technical Specification Group Radio Access Network; Evolved Universal Terrestrial Radio Access (E-UTRA); Radio Resource Control (RRC); Protocol specification (Release 11)" may be used for the connection establishment between the terminal devices and the RAN.

In a D2D discovery 41, the UE detects the presence of the first terminal device (labeled B1 in FIG. 4). In a D2D discovery 51, the UE detects the presence of the second terminal device (labeled B2 in FIG. 4).

The UE transmits a repeater information request 42 to the first terminal device. In response to transmitting the repeater information request 42, the UE receives a repeater information response 43. The repeater information response 43 may include information on the repeater capability of the first terminal device. The repeater information response 43 may include configuration information for the first terminal device. The configuration information may include an indicator for a network coverage quality at the first terminal device and/or terminal related information, as explained above. At least some of the configuration information may be measured at the first terminal device.

The UE transmits a repeater information request 52 to the second terminal device. In response to transmitting the repeater information request 52, the UE receives a repeater information response 53. The repeater information response 53 may include information on the repeater capability of the second terminal device. The repeater information response 53 may include configuration information for the second terminal device. The configuration information may include an indicator for a network coverage quality at the second terminal device and/or terminal related information, as explained above. At least some of the configuration information may be measured at the second terminal device.

In response to receiving a repeater information response 43, 53 from at least one terminal device, the UE performs a selection 44. The selection 44 may include a prioritization among the terminal device(s) which transmitted a repeater information response 43, 53 indicating that the respective terminal device is willing to start acting as a repeater.

The UE transmits a repeater transition request 45 to the selected terminal device. For illustration, if the first terminal device B1 is given priority over the second terminal device B2 in the selection 44, the repeater transition request 45 is transmitted to the first terminal device B1. The repeater transition request 45 indicates that the selected terminal device shall activate its repeater function.

The repeater transition request 45 triggers the selected terminal device to start the signaling for activating the repeater function. The signaling may involve the transmission of messages between the selected terminal device and the RAN of the wireless communication network. The signaling performed in the D2D discovery 41, 51 and/or in retrieving the relevant information from the terminal devices by messages 42, 43, 52, 53 may be D2D communication which does not transition the RAN.

The signaling in the activation procedure 46 may be performed according to any one of the various techniques disclosed in PCT application PCT/IB2013/000949.

Figure 5:
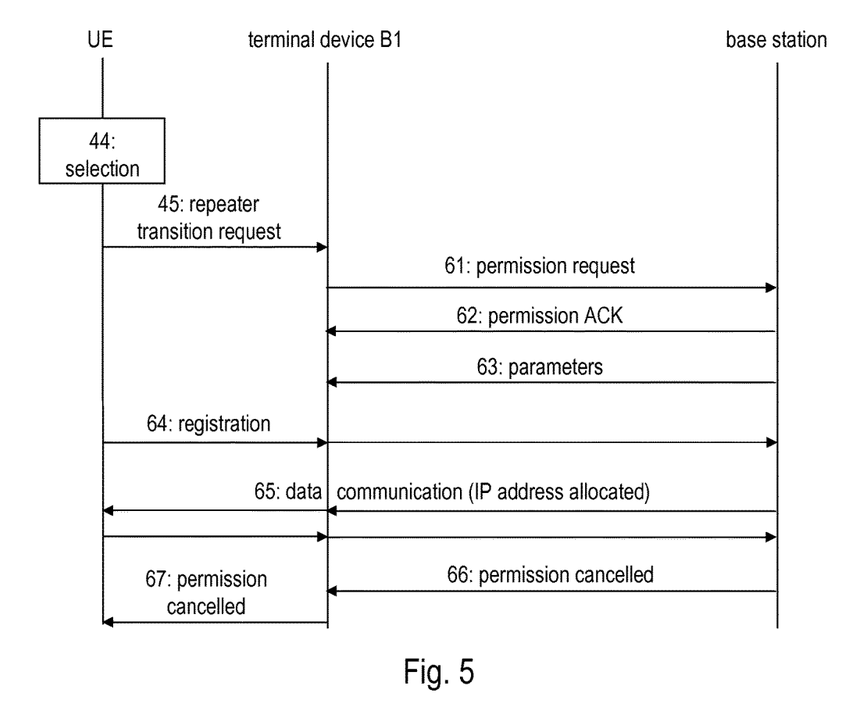
FIG. 5 is a diagram representing signaling in a method according to an embodiment.

FIG. 5 illustrates an exemplary implementation of the signaling performed between the selected terminal device and the base station to activate the repeater function.

In response to receiving the repeater transition request 45, the selected terminal device may send a permission request 61 to the base station. The permission request 61 is transmitted to request permission for activating the repeater function of the selected terminal device.

The selected terminal device receives a response from the base station. If the base station gives permission for activating the repeater function of the selected terminal device, the base station may transmit a permission acknowledgment message 62 to the selected terminal device. If a permission acknowledgment 62 is received from the base station, the selected terminal device may receive parameters 63 for configuring the repeater function from the base station. For illustration, the parameters may define a maximum output power of a radio signal for forwarding communication data to the UE, a cell identifier to be used by the selected terminal device in case it sets up a new radio cell, a neighbor cell identifier of a neighbor base station located in the neighborhood of the base station, and a frequency band for a radio signal for forwarding data messages to the UE. The repeater function is then activated in the selected terminal device. The repeater function may be performed under the control of a processing device of the selected terminal device.

The UE may perform a registration 64 which may be relayed by the selected terminal device to the base station. In the subsequent data communication 65, the selected terminal device may forward data communication in the uplink received from the UE to the base station. The data communication may be performed as data communication with IP address allocated. The selected terminal device may forward data communication in the downlink received from the base station to the UE. The transmission between the UE and the selected terminal device may be implemented in D2D communication. This leg of the transmission path, i.e. the leg between the UE and the selected terminal device which acts as a repeater, may be implemented such that the messages do not transition the RAN.

The repeater function of the selected terminal device may be implemented such that a received data message from the UE in the uplink is forwarded to the base station without modifying digital data included in the respective data message. The repeater function of the selected terminal device may be implemented such that a received data message from the base station in the downlink is forwarded to the UE without modifying digital data included in the respective data message. In this case, the digital data content of the message may be identical when forwarding the message, while radio parameters (e.g. frequency band etc.) may still be different.

The repeater function of the selected terminal device may be implemented such that a portion of the digital data included in a data message transmitted in the downlink and/or uplink is modified before the repeater function of the selected terminal device forwards the message. For illustration, a new cell identifier may be assigned for a cell set up by the selected terminal device when acting as a repeater. The repeater function in the selected terminal device may then respectively replace cell identifiers in the uplink and downlink communication when forwarding data messages between the UE and the base station. I.e., the selected terminal device, while still acting as a repeater, may also modify at least some data of the messages forwarded between the UE and the base station.

The repeater function of the selected terminal device may be deactivated at any time. For illustration, the repeater function may be deactivated upon receiving a corresponding request 66 from the base station. In this case, the selected terminal device may transmit a permission cancelled message 67 to the UE to inform the UE that the base station has cancelled the permission. Alternatively or additionally, the repeater function may be deactivated upon request from the UE.

The transition of a terminal device to a repeater may be implemented as a proximity based service. The proximity based service may be selectively activated depending on, for example, whether the requesting UE indicates that it requires the repeater function in an emergency situation, as will be explained in more detail with reference to FIG. 6 and FIG. 7. Alternatively or additionally, the terminal devices located in proximity to the requesting UE may use any one of a variety of other criteria for deciding whether they are capable of activating the repeater function for the UE. For illustration, the user of a terminal device may specify criteria for activating repeater functions, e.g., activating the repeater function selectively depending on a UE identifier, such that the repeater function may only be offered to UEs operated by certain organizations or persons, or activating the repeater function only when a neighbor base station of the serving base station has a failure. The users of some user terminals may also indicate that the respective user terminal is not to act as a repeater in general, possibly with the exception of relaying emergency communication.

Figure 6:
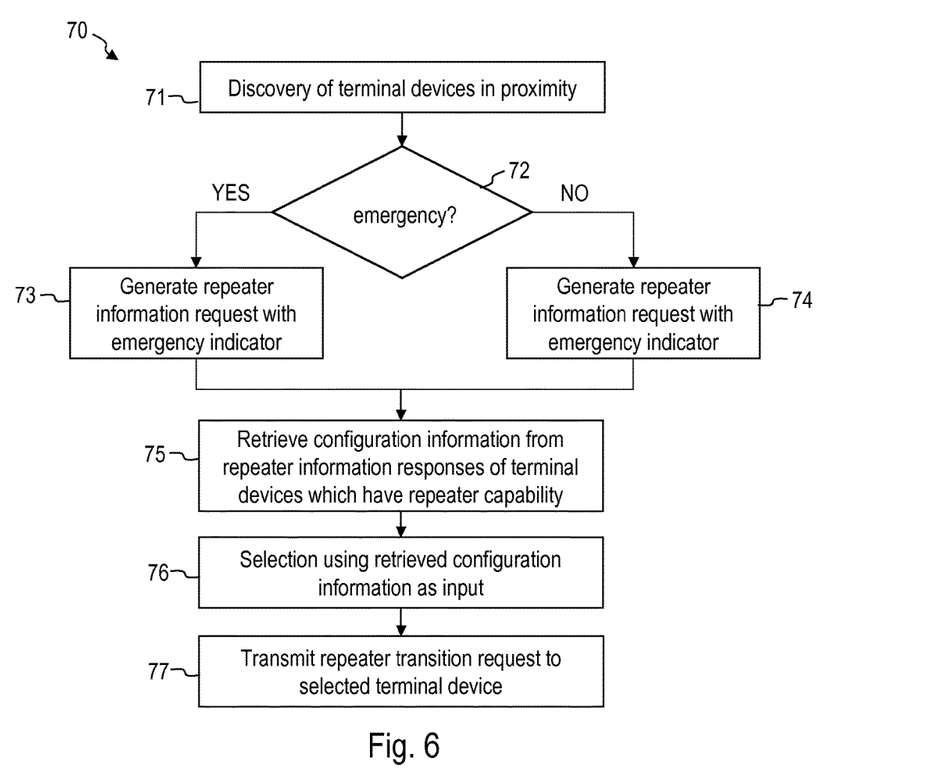
FIG. 6 is a flow chart of a method of requesting activation of a repeater function according to an embodiment.

FIG. 6 is a flow chart of a method 70 of requesting activation of a repeater function. The method 70 may be performed by a UE 2 according to an embodiment. In the method 70, the repeater information request is generated such that it includes an indicator for emergency communication.

At 71, at least one terminal device located in proximity to the UE is detected. A D2D discovery may be performed in step 71.

At 72, it is determined whether the repeater function is required for an emergency communication. The determination may be performed by querying a user interface of the UE 2. In response to an input on the user interface indicating that the communication is an emergency communication, at 73 the UE 2 may generate a repeater information request which includes an indicator indicating that the repeater function is required for emergency communication. Otherwise, at 74 the UE 2 may generate a repeater information request which includes an indicator indicating that the repeater function is required for a communication which is not emergency communication.

The repeater information request may respectively be transmitted as a dedicated message to the terminal devices discovered at step 71.

At 75, a repeater information response may be received from at least one terminal device. Repeater information responses may be received from a plurality of terminal devices. Configuration information may be retrieved from the repeater information responses. The configuration information may respectively include indicators which allow the UE to determine whether the responding terminal device would be suitable for acting as a repeater and/or to perform a prioritization among several terminal devices to identify the terminal device which would be most suitable for acting as a repeater. The configuration information may include a network coverage quality indicator for the terminal. The network coverage quality indicator may comprise an indicator for a received signal strength at the terminal device. Alternatively or additionally, the configuration information may include mobility data for the terminal device. The mobility data may quantify how stationary or mobile the terminal device has been in a time interval prior to receipt of the repeater information request. The mobility data may be indicative of how often the respective terminal device has changed the serving radio cell in the time interval in the past, for example. Alternatively or additionally, the configuration information may include an output power capability indicator indicating an upper bound or maximum of an output power for communication towards the UE. Alternatively or additionally, the configuration information may include a power supply indicator for the terminal device. The power supply indicator may reflect a battery level of the terminal device from which the respective repeater information response is received. Alternative or additional data may be included in the configuration information, e.g. information relating to security settings of the terminal device.

At 76, the UE selects one of the responding terminal devices. The UE may perform a selection algorithm among the terminal devices for which the repeater information response indicates that the respective terminal devices could act as repeaters. The selection algorithm may use the retrieved configuration information as input. For illustration, a target function quantifying the suitability of a terminal device for acting as a repeater may be evaluated, with the configuration information being input to the evaluation of the target function. The numerical values obtained by may be compared to determine the most suitable terminal device. Alternatively or additionally, at least one threshold comparison may be performed to exclude responding terminal devices which are unacceptable for acting as a repeater, because they report too low network coverage quality and/or too high mobility and/or too lower output power capability and/or too lower battery level.

The UE may prioritize terminal devices in the selection procedure. The selection may be implemented such that a terminal device reporting lower mobility is prioritized over a terminal device reporting higher mobility. Alternatively or additionally, the selection may be implemented such that a terminal device reporting that it has higher power supply is prioritized over a terminal device reporting that it has lower power supply. Alternatively or additionally, the selection may be implemented such that a terminal device reporting that it has better network coverage quality is prioritized over a terminal device reporting that it has worse network coverage quality. Alternatively or additionally, the selection may be implemented such that a terminal device reporting that it is capable of transmitting at higher output power is prioritized over a terminal device reporting that it is capable of transmitting at lower output power.

At least one criterion used in the selection at 76 may be configurable by a user. The UE may have an input interface which allows a user to select the information on the terminal device configuration that is taken into account. The UE may have an input interface which allows a user-defined weighting of various data in the selection algorithm. For illustration, the user of the UE may specify that the mobility and/or battery level of the terminal device should have little weight or should be completely disregarded when selecting the terminal device which is to act as a repeater. The UE may be configured such that at least one parameter of a selection mechanism, in particular at least one parameter of a selection algorithm, may be adjusted in response to a user input.

At 77, a repeater transition request is transmitted to the selected terminal device.

Figure 7:
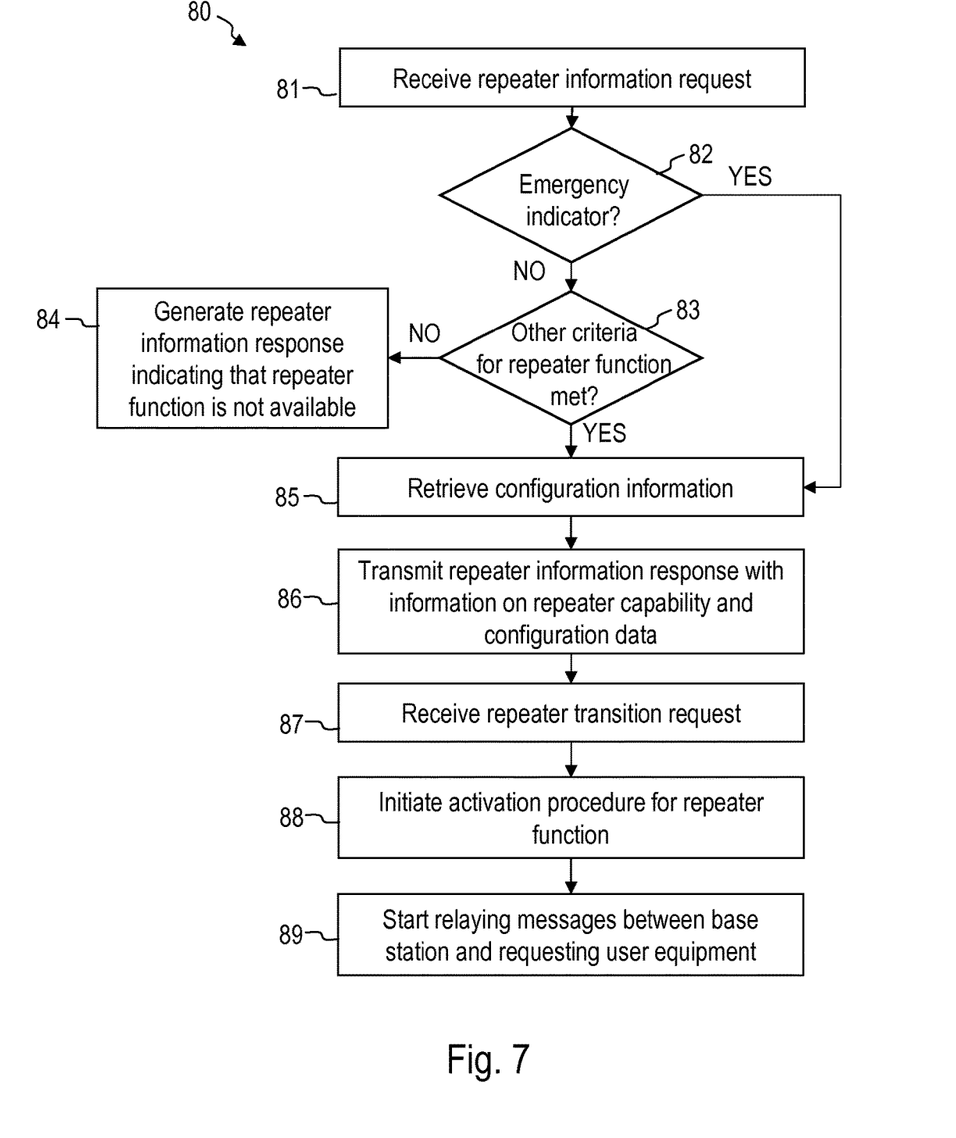
FIG. 7 is a flow chart of a procedure performed by a terminal device of a communication system according to an embodiment.

FIG. 7 is a flow chart of a method 80 which may be performed by a terminal device of a communication system according to an embodiment. A UE according to an embodiment, which is capable of transitioning into a repeater relay, may also perform the method 80.

At 81, the terminal device receives a repeater information request from a UE.

At 82, the terminal device determines whether an indicator for emergency communication is included in the repeater information request received from the UE. If an indicator for emergency communication is included, the method proceeds to step 85 where to collect data for the repeater information response. Otherwise, the method may proceed to step 83.

At step 83, the terminal device determines whether it may activate its repeater function for any other reason. For illustration, the terminal device may determine based on user preferences stored in a memory of the terminal device whether it may act as a repeater for non-emergency communication. The terminal device may also determine based on user preferences stored in the memory of the terminal device or a user input whether a condition is fulfilled in which it may activate its repeater function for the requesting UE. If the terminal device determines that it may not activate its repeater function for the requesting UE, the method proceeds to step 84. At 84, a repeater information response is generated and transmitted to the requesting UE. The repeater information response at 84 includes a repeater capability information indicating that the terminal device is not capable of acting as a repeater for the requesting UE. If the terminal device determines that it may activate its repeater function for the requesting UE, the method proceeds to step 85.

At 85, the configuration information is retrieved which is to be included in the repeater information response. The configuration information may include a network coverage quality indicator. The terminal device may monitor a received signal strength for signals received from the base station and may generate an indicator for the network coverage quality based thereon. Quality indicators other than the received signal strength may be used in addition or alternatively, e.g. signal-to-noise etc. Alternatively or additionally, the configuration information may include mobility data for the terminal device. The terminal device may monitor location changes and may compute a quantifier for its mobility based thereon. For illustration, the number of times the terminal device changed the serving radio cell may be used to quantify its mobility. Other indicators may be used, e.g. indicators for distances over which the terminal device has moved in a pre-defined time interval. Mobility statistics is generally detected in many terminal devices. This mobility statistics may be used to generate an indicator for the terminal device mobility which is included in the repeater information response. Alternatively or additionally, the configuration information may include an output power capability indicator indicating an upper bound or maximum of an output power for communication towards the UE. The terminal device may determine this indicator based on its power supply and/or parameters set in the terminal device. Alternatively or additionally, the configuration information may include a power supply indicator for the terminal device. The terminal device may monitor a battery level to generate the power supply indicator.

At 86, a repeater information response is generated and transmitted. The repeater information response includes repeater capability information indicating that the terminal device is capable of acting as a repeater. The repeater information response may include the configuration information which allows the UE to determine how suitable the terminal device would be for acting as a repeater.

If the terminal device is selected by the UE for activating its repeater function, steps 87-89 may subsequently be performed. At 87, the terminal device receives a repeater transition request from the UE. At 88, the terminal device starts an activation procedure for its repeater function. At 89, the terminal device starts relaying data messages and/or signaling messages between the base station and the UE.

Figure 8:
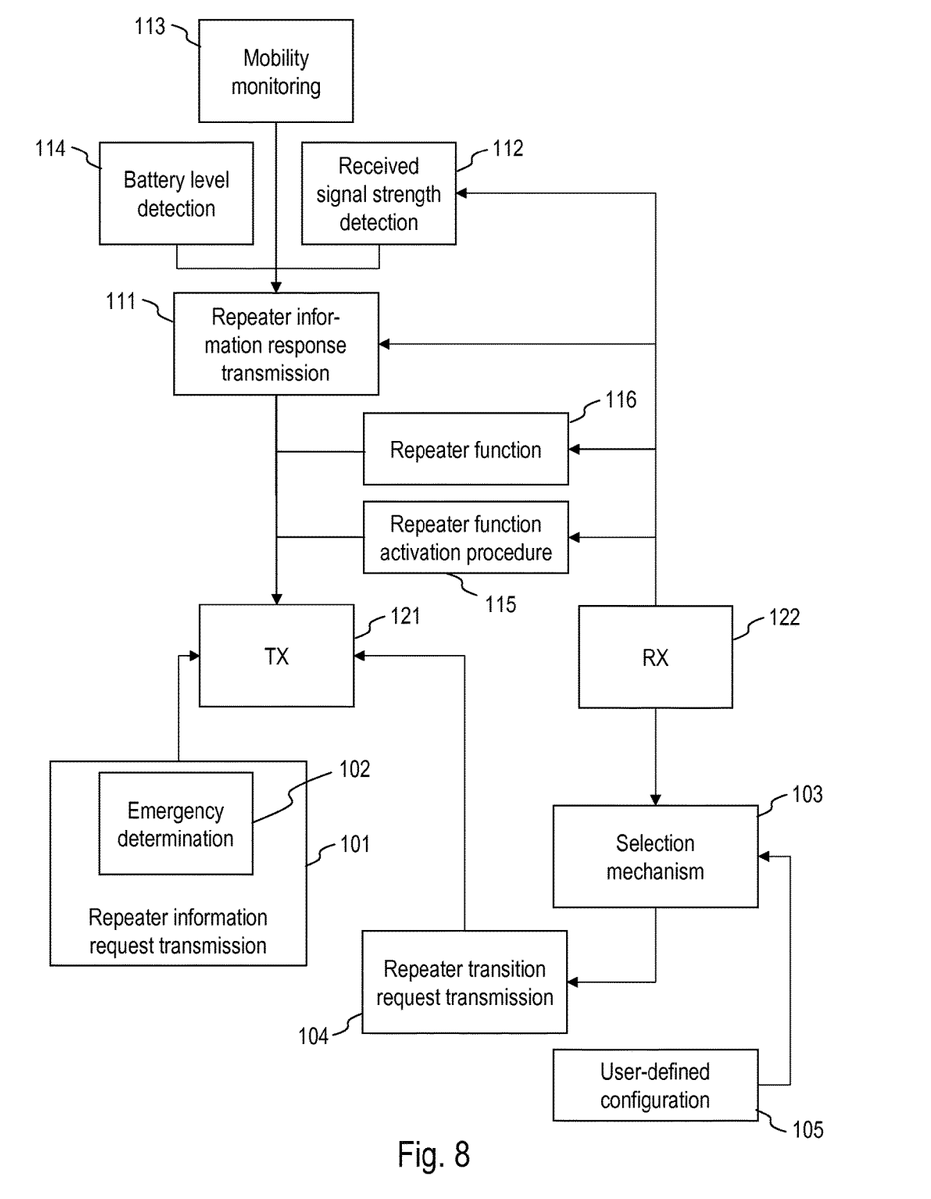
FIG. 8 is a functional block diagram of a user equipment according to an embodiment.

FIG. 8 is a functional block diagram of a UE according to an embodiment. The various functions may be performed by the processing device of a UE 2 according to an embodiment. Functions 101-105 are functions performed by the UE when the UE has to request another terminal device to transition into a repeater relay. Functions 111-116 are functions performed by the UE when the UE is a candidate repeater for another UE. Not all of the various functions need to be implemented in a UE. For illustration, a UE may be configured such that it may request another terminal device to transition into a repeater relay using some or all of functions 101-105, while the UE itself is not configured to transition into a repeater relay. In this case, functions 111-116 may be omitted in the UE. For further illustration, a UE may be configured such that it may transition into a repeater relay, while the UE itself is not configured to request another terminal device to transition into a repeater relay. In this case, functions 101-105 may be omitted.

The processing device of the UE 2 may be configured to execute a repeater information request transmission function 101. The repeater information request transmission function 101 may control a processing path 121 for transmit data. The repeater information request transmission function 101 may include an emergency determination function 102 to determine whether the repeater function is required for an emergency communication. The emergency determination function 102 may make this determination responsive to a user input received at a user interface of the UE 2. The repeater information request transmission function 101 may generate the repeater information request in dependence on whether the emergency determination function 102 determines that the repeater function is required for an emergency communication.

The processing device of the UE 2 may be configured to execute a selection mechanism 103. The selection mechanism 103 may be a selection algorithm. The selection mechanism 103 may select one terminal device from one or several terminal devices from which a repeater information response is received at a processing path 122 for receive data of the UE 2. The selection mechanism 103 may perform a prioritization among several terminal devices from which a repeater information response is received. A result of the selection may be provided by the selection mechanism 103 to a repeater transition request transmission function 104.

The processing device of the UE 2 may be configured to execute the repeater transition request transmission function 104. The repeater transition request transmission function 104 may control the processing path 121 for transmit data to transmit the repeater transition request to the selected terminal device, based on an output of the selection mechanism 103.

The processing device of the UE 2 may be configured to execute a function 105 for setting at least one parameter of the selection mechanism 103. The function 105 may receive an input from a user interface. The function 105 may adjust one or several parameters of the selection mechanism 103. For illustration, weighting factors reflecting the weight of different parameters (e.g., network coverage quality, battery level, output power capability, mobility etc.) in a prioritization may be adjusted by the function 105.

When the UE 2 is configured to transition into a repeater relay, the processing device of the UE 2 may execute functions 111-116. The processing device may execute an activation procedure 115 for the repeater function. The activation procedure 115 may comprise requesting permission from the base station for the UE 2 to start acting as a repeater relay. The processing device may be configured to execute a repeater function 116. The repeater function 116 may be operative to forward data messages or signaling messages between the UE and the base station in the uplink and the downlink. The repeater function may be operative to modify a portion of control data included in a message, e.g. identifiers for transmitting or receiving devices or a cell identifier.

The processing device of the UE 2 may be configured to execute a repeater information response transmission function 111. The repeater information response transmission function 111 may be executed in response to receiving another repeater information request from a requesting UE at the processing path 122 for receive data. The repeater information response transmission function 111 may control the processing path 121 for transmit data to transmit the repeater information response. The repeater information response may be generated to include information on a repeater capability of the UE 2, indicating whether the UE 2 can transition into a repeater relay for relaying messages between the requesting UE and the base station.

The processing device of the UE 2 may be configured to generate the repeater information response such that it includes configuration information for the UE 2. The processing device may execute functions for detecting the configuration information. For illustration, a function 112 for detecting a received signal strength may be executed to quantify the network coverage quality at the UE 2. Alternatively or additionally, a function 113 for monitoring mobility may be performed. The function 113 for mobility monitoring may track changes in the serving radio cell, motion patterns, or other quantities indicative of a mobility of the UE 2. The function 113 for mobility monitoring may collect mobility statistics. Alternatively or additionally, a function 114 for detecting a battery level may be performed. Alternatively or additionally, a function for detecting an output power capability may be performed. The respective information relating to the suitability of the UE 2 as a repeater may be included in the repeater information response.

Embodiments of the invention have been described with reference to the drawings. In any one of the various embodiments, the procedure for causing a terminal device to transition into a repeater relay may be implemented as a proximity-based service. The signaling involved in the identification and selection of the terminal device may be performed as direct communication between UE and terminal devices, which does not transition the RAN of the wireless communication network.

In any one of the various embodiments, the signaling used to identify a terminal device which is suitable for transitioning into a repeater relay may be implemented on the first layer, the second layer or the third layer of the Open Systems Interconnection (OSI) layer model. The transmission of the repeater information request and the repeater information response may be implemented on the first layer, the second layer or the third layer of the OSI layer model. The transmission of the repeater information request and the repeater information response may be implemented as D2D signaling on the first, second or third layer of the OSI layer model.

In any one of the various embodiments, the signaling used to identify a terminal device which is suitable for transitioning into a repeater relay may be performed without being inside the E-UTRAN network coverage.

Modifications or alterations may be implemented in other embodiments. For illustration, additional information may be included in the repeater information request.

The additional information may be indicative of bandwidth requirements for the communication for which repeater functionality is required. The additional information may be indicative of a type of service for which repeater functionality is required.

For further illustration, while the repeater information request may be transmitted as a dedicated signaling message to each terminal device detected in a D2D discovery, the repeater information request may also be transmitted as a broadcast or multicast message. The D2D discovery may be omitted.

For further illustration, while exemplary data have been described which are suitable for transmission as configuration information in the repeater information response, other information may alternatively or additionally be included in the repeater information response as configuration information. For illustration, security-related information may be included in the configuration information.

Embodiments of the invention provide a signaling functionality which allows a UE to identify terminal devices with the capability to act as a repeater and to select one or several of the terminal devices for transitioning into a repeater relay.

The invention claimed is:

1. A method of requesting by a user equipment activation of a repeater function in at least one associated terminal device the user equipment being configured to communicate with an associated radio access network, the method comprising:

transmitting, by the user equipment, a repeater information request to the at least one associated terminal device to request information on a repeater capability of the at least one associated terminal device for performing the repeater function, the at least one associated terminal device being configured to communicate with the associated radio access network;

including an indicator in the repeater information request, the indicator indicating that the repeater function is required to be used for emergency communication for public safety requirements, wherein the repeater function is for relaying emergency communication messages transmitted by the user equipment to an associated base station in the associated radio access network;
receiving, by the user equipment, at least one repeater information response from the at least one associated terminal device;
selecting, by the user equipment, a selected associated terminal device from the at least one associated terminal device based on the received at least one repeater information response; and
transmitting, by the user equipment, a repeater transition request to the selected associated terminal device, the repeater transition request requesting the selected associated terminal device to initiate activation of the repeater function,
wherein the at least one associated terminal device is separate from the user equipment.

2. The method according to claim 1, wherein each repeater information response of the at least one repeater information response comprises information on a repeater capability of the respective associated terminal device.

3. The method according to claim 1, wherein the at least one repeater information response comprises configuration information for the at least one associated terminal device from which the repeater information response is received, and wherein the user equipment evaluates the configuration information included in the at least one repeater information response to select the selected associated terminal device.

4. The method according to claim 3, wherein the configuration information comprises one or more of:
a network coverage quality indicator for the at least one associated terminal device from which the respective repeater information response is received,
mobility data for the at least one associated terminal device from which the respective repeater information response is received,
an output power capability indicator for the at least one associated terminal device from which the respective repeater information response is received, and/or
a power supply indicator for the at least one associated terminal device from which the respective repeater information response is received.

5. The method according to claim 3, further comprising performing by the user equipment a prioritization based on the configuration information included in the at least one repeater information response to select the selected associated terminal device.

6. The method according to claim 1, further comprising:
performing, by the user equipment, a device-to-device discovery to discover the at least one associated terminal device, wherein the user equipment transmits the repeater information request to the at least one associated terminal device discovered in the device-to-device discovery.

7. The method according to claim 1, further comprising:
activating, by the selected associated terminal device, the repeater function in response to receiving the repeater transition request from the user equipment.

8. The method according to claim 7, wherein activating the repeater function comprises:
requesting, by the selected associated terminal device, a base station to permit activation of the repeater function, and
receiving, by the selected associated terminal device, a permission from the base station to activate the repeater function.

9. A user equipment, comprising:
a wireless interface configured for communication with an associated radio access network of an associated wireless communication network, and
a processing device coupled with the wireless interface and configured to:
transmit, via the wireless interface, a repeater information request to at least one associated terminal device to request information on a repeater capability of the at least one associated terminal device for performing the repeater function, wherein the at least one repeater information request comprises an indicator indicating that the repeater function is required to be used for emergency communication for public safety requirements, wherein the repeater function is for relaying emergency communication messages transmitted by the user equipment to an associated base station in the associated radio access network;
receive, via the wireless interface, at least one repeater information response from the at least one associated terminal device;
select a selected associated terminal device from the at least one associated terminal device based on the received at least one repeater information response; and
transmit, via the wireless interface, a repeater transition request to the selected associated terminal device, the repeater transition request requesting the selected associated terminal device to activate a repeater function of the selected associated terminal device,
wherein the at least one associated terminal device is separate from the user equipment.

10. The user equipment according to claim 9, wherein the processing device is configured to determine, based on each repeater information response of the at least one repeater information response, whether each associated terminal device from which the each repeater information response is received is capable of activating its respective the repeater function and acting as a repeater.

11. The user equipment according to claim 9, wherein the processing device is configured to evaluate configuration information included in the at least one repeater information response to select the selected associated terminal device.

12. The user equipment according to claim 11, wherein the configuration information comprises one or more of:
a network coverage quality indicator for the at least one associated terminal device from which the respective repeater information response is received,
mobility data for the at least one associated terminal device from which the respective repeater information response is received,
an output power capability indicator for the at least one associated terminal device from which the respective repeater information response is received, and/or
a power supply indicator for the at least one associated terminal device from which the respective repeater information response is received.

13. The user equipment according to claim 9, wherein the processing device is further configured to:
receive, via the wireless interface, another repeater information request from an associated requesting user equipment, and
transmit, via the wireless interface, another repeater information response to the associated requesting user equipment.

14. The user equipment according to claim 13, wherein the processing device is configured to generate the another repeater information response comprising information indicating a repeater capability of the user equipment and configuration information detected at the user equipment.

15. A wireless communication network, comprising:
a radio access network;
a user equipment; and
at least one terminal device having a wireless interface configured to communicate with the radio access network and to transmit a repeater information response when receiving a repeater information request from the user equipment,
wherein the at least one terminal device is separate from the user equipment,
wherein the user equipment comprises:
a wireless interface configured for communication with the radio access network and
a processing device coupled with the wireless interface, the processing device operating to:
transmit, via the wireless interface, the repeater information request to the at least one terminal device to request information on a repeater capability of the at least one terminal device for performing the repeater function, wherein the repeater information request comprises an indicator indicating that the repeater function is required to be used for emergency communication for public safety requirements, wherein the repeater function is for relaying emergency communication messages transmitted by the user equipment to an associated base station in the radio access network;
receive, via the wireless interface, at least one repeater information response from the at least one terminal device;
select a selected associated terminal device from among the at least one terminal device based on the received at least one repeater information response; and
transmit, via the wireless interface, a repeater transition request to the selected terminal device, the repeater transition request requesting the selected terminal device to activate a repeater function of the selected terminal device.

16. The method according to claim 1, wherein receiving the at least one repeater information response comprises selectively receiving the at least one repeater information response based upon the indicator indicating that the repeater function is required to be used for the emergency communication for public safety requirements.

17. The method of claim 1, further comprising:
determining, by the at least one associated terminal device, that the indicator indicates that the repeater function is required to be used for the emergency communication for public safety requirements; and
in response to determining that the indicator indicates that the repeater function is required to be used for the emergency communication for public safety requirements, selectively transmitting, by the at least one associated terminal device, the at least one repeater information response.

\* \* \* \* \*